US007907751B2

(12) United States Patent
Asano

(10) Patent No.: US 7,907,751 B2
(45) Date of Patent: Mar. 15, 2011

(54) IMAGE PROCESSING APPARATUS, METHOD, AND PROGRAM

(75) Inventor: Yasuharu Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1063 days.

(21) Appl. No.: 11/638,013

(22) Filed: Dec. 13, 2006

(65) Prior Publication Data
US 2007/0160294 A1 Jul. 12, 2007

(30) Foreign Application Priority Data

Dec. 15, 2005 (JP) ................................. 2005-361347

(51) Int. Cl.
*G06K 9/00* (2006.01)
*H04N 5/232* (2006.01)
(52) U.S. Cl. .................................. 382/103; 348/211.14
(58) Field of Classification Search .................. 382/103, 382/107, 190; 348/154, 155, 169–172, 211.14, 348/222.1, 231.6
See application file for complete search history.

(56) References Cited

U.S. PATENT DOCUMENTS

| 4,610,025 | A | * | 9/1986 | Blum et al. | 382/177 |
| 6,141,435 | A | * | 10/2000 | Naoi et al. | 382/104 |
| 6,643,400 | B1 | * | 11/2003 | Murakawa et al. | 382/195 |
| 2004/0109587 | A1 | | 6/2004 | Segawa et al. | |
| 2005/0089223 | A1 | | 4/2005 | Krumm | |

FOREIGN PATENT DOCUMENTS

| JP | 7 219703 | 8/1995 |
| JP | 9 34863 | 2/1997 |
| JP | 11 175665 | 7/1999 |
| JP | 2000 311180 | 11/2000 |
| JP | 2003 216955 | 7/2003 |
| JP | 2004 145416 | 5/2004 |
| JP | 2005 39354 | 2/2005 |
| JP | 2005 196750 | 7/2005 |
| JP | 2005 339000 | 12/2005 |
| WO | WO 2004 072897 | 8/2004 |

OTHER PUBLICATIONS

Niklaus Wirth: "Algorithms & Data Structures", Jan. 1986, pp. 17-72, XP-002322129.
Naaman, M. and Yeh, R.B. and Garcia-Molina, H. and Paepcke, A: "Leveraging context to resolve identity in photo albums" Proceedings of the 5$^{TH}$ ACM/IEEE-CS Joint Conference on Digital Libraries, Jun. 7, 2005-Jun. 11, 2005 pp. 178-187, XP002429187 Denver, Colorado, USA.

(Continued)

*Primary Examiner* — Abolfazl Tabatabai
(74) *Attorney, Agent, or Firm* — Frommer Lawrence & Haug LLP; William S. Frommer; Thomas F. Presson

(57) ABSTRACT

An image processing apparatus includes an extraction section, a parameter retaining section, a context retaining section, and a decision section. The extraction section extracts a characteristic amount of a region in which a recognition object may possibly be included from within an image of a processing object. The parameter retaining section retains a parameter regarding the recognition object. The context retaining section retains a context regarding the recognition object. The decision section decides based on the characteristic amount extracted by the extraction section, the parameter retained in the parameter retaining section, and a result of arithmetic operation performed using the context retained in the context retaining section whether or not an image in the region is the recognition object.

9 Claims, 7 Drawing Sheets

OTHER PUBLICATIONS

Longbin Chen et al: "Face annotation for family photo management" International Journal of Image and Graphics, World Scientific Publishing Co., Singapore, SG, vol. 3, No. 1, Dec. 30, 2002, pp. 81-94, XP002361519 ISSN: 0219-4678.

Mulhem, P. and Lim, J.H: "Home photo retrieval: time matters" Lecture Notes in Computer Science, CIVR 2003, vol. 2728, Jul. 2003, pp. 321-330, XP002429188.

Marc Davis et al: "From Context to Content: Leveraging Context to Infer Media Metadata" Proceedings of the 12$^{TH}$ Annual ACM International Conference on Multimedia, Oct. 10, 2004 pp. 188-195, XP002374239.

Girgensohn A et al: "Simplifying the Management of Large Photo Collections" Proceedings of the International Conference on Human-Computer Interaction, Amsterdam, NL, Sep. 1, 2003, pp. 196-203, XP002407104.

N. Haering, N. Da Vitoria Lobo: "Visual Event Detection" 2001, Kluwer International Series in Video Computing, Kluwer Academic Publ., Norwell, MA, US, XP002429190.

* cited by examiner

FIG. 2

| | FRIEND A | FRIEND B | COLLEAGUE C | GOLF CLUB | SKI | GLOVE | BAT | ... |
|---|---|---|---|---|---|---|---|---|
| FRIEND A | 0.0 | 0.3 | 0.01 | 0.4 | 0.02 | 0.02 | 0.02 | |
| FRIEND B | 0.3 | 0.0 | 0.01 | 0.02 | 0.35 | 0.02 | 0.02 | |
| COLLEAGUE C | 0.01 | 0.01 | 0.0 | 0.1 | 0.02 | 0.02 | 0.02 | |
| GOLF CLUB | 0.4 | 0.02 | 0.1 | ... | 0.02 | 0.02 | 0.02 | |
| SKI | 0.02 | 0.35 | 0.02 | 0.02 | 0.15 | 0.02 | 0.02 | |
| GLOVE | 0.02 | 0.02 | 0.02 | 0.02 | 0.02 | 0.20 | 0.4 | |
| BAT | 0.02 | 0.02 | 0.02 | 0.02 | 0.02 | 0.4 | 0.15 | |
| ... | | | | | | | | |

| | FRAME-IN | SIT ON SOFA | OPERATE REMOTE CONTROLLER | READ NEWSPAPER | ... |
|---|---|---|---|---|---|
| FRAME-IN | 0.05 | 0.4 | 0.15 | 0.1 | |
| SIT ON SOFA | 0.0 | 0.1 | 0.25 | 0.25 | |
| OPERATE REMOTE CONTROLLER | 0.0 | 0.2 | 0.1 | 0.3 | |
| READ NEWSPAPER | 0.0 | 0.1 | 0.2 | 0.1 | |
| ... | | | | | |

62

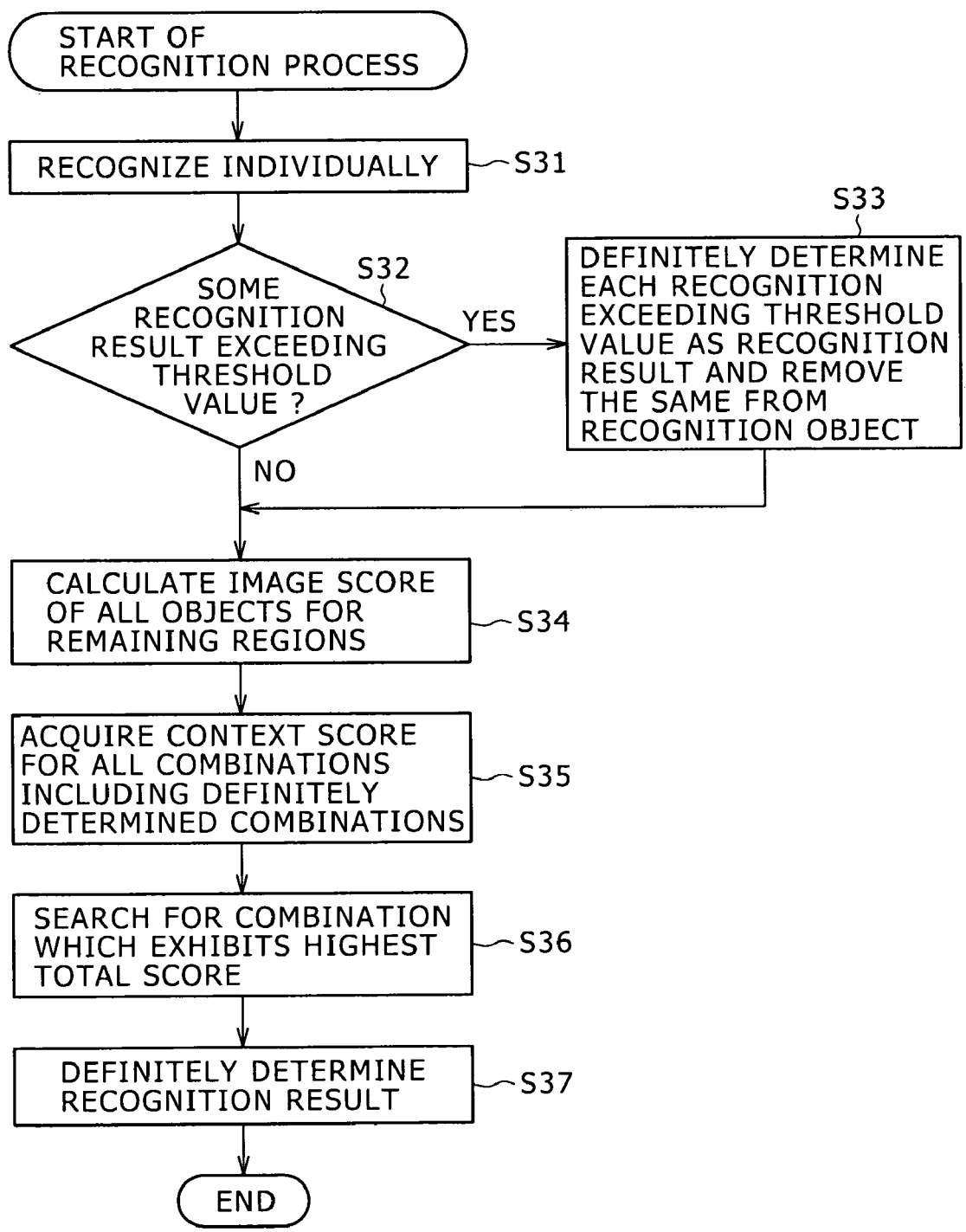

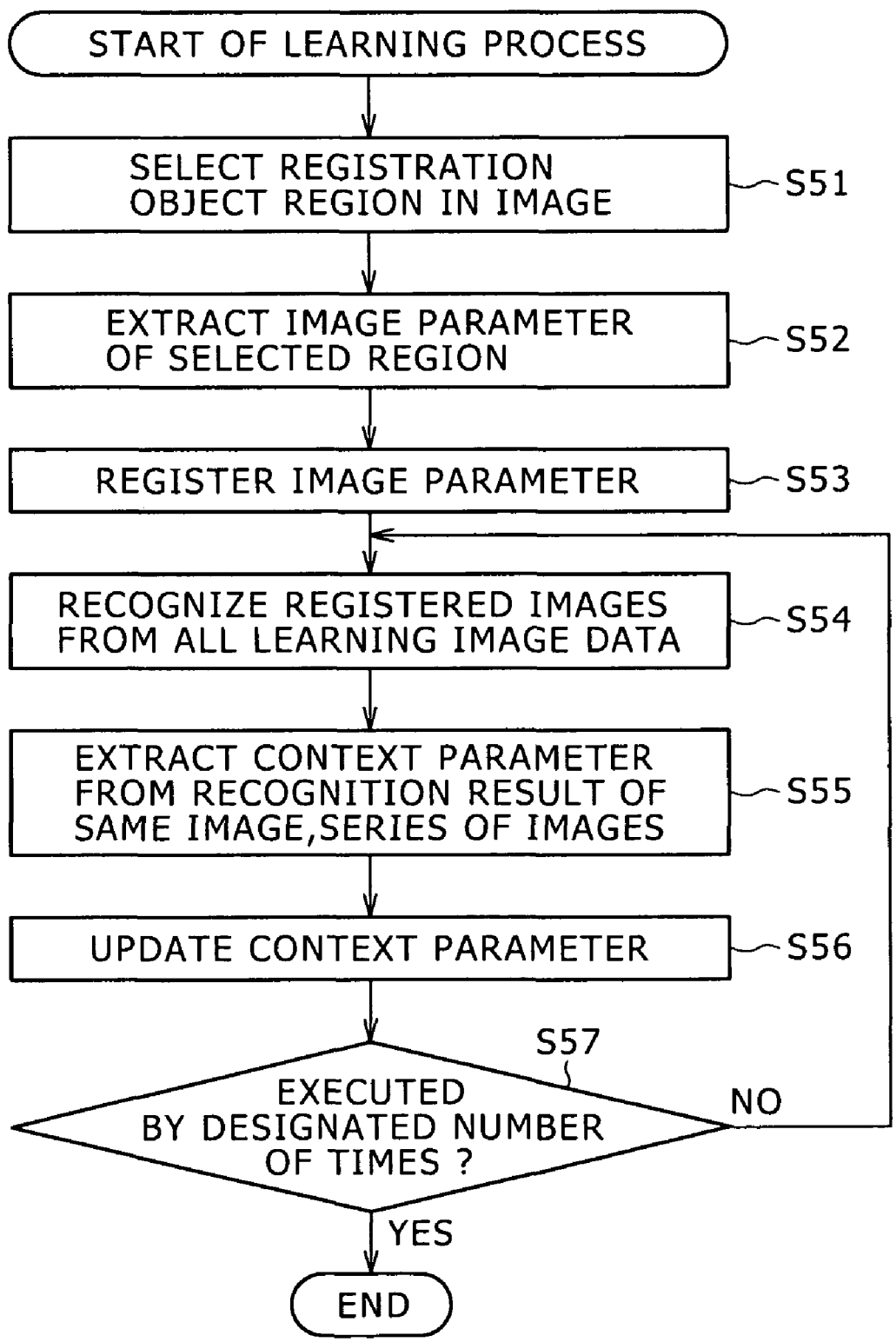

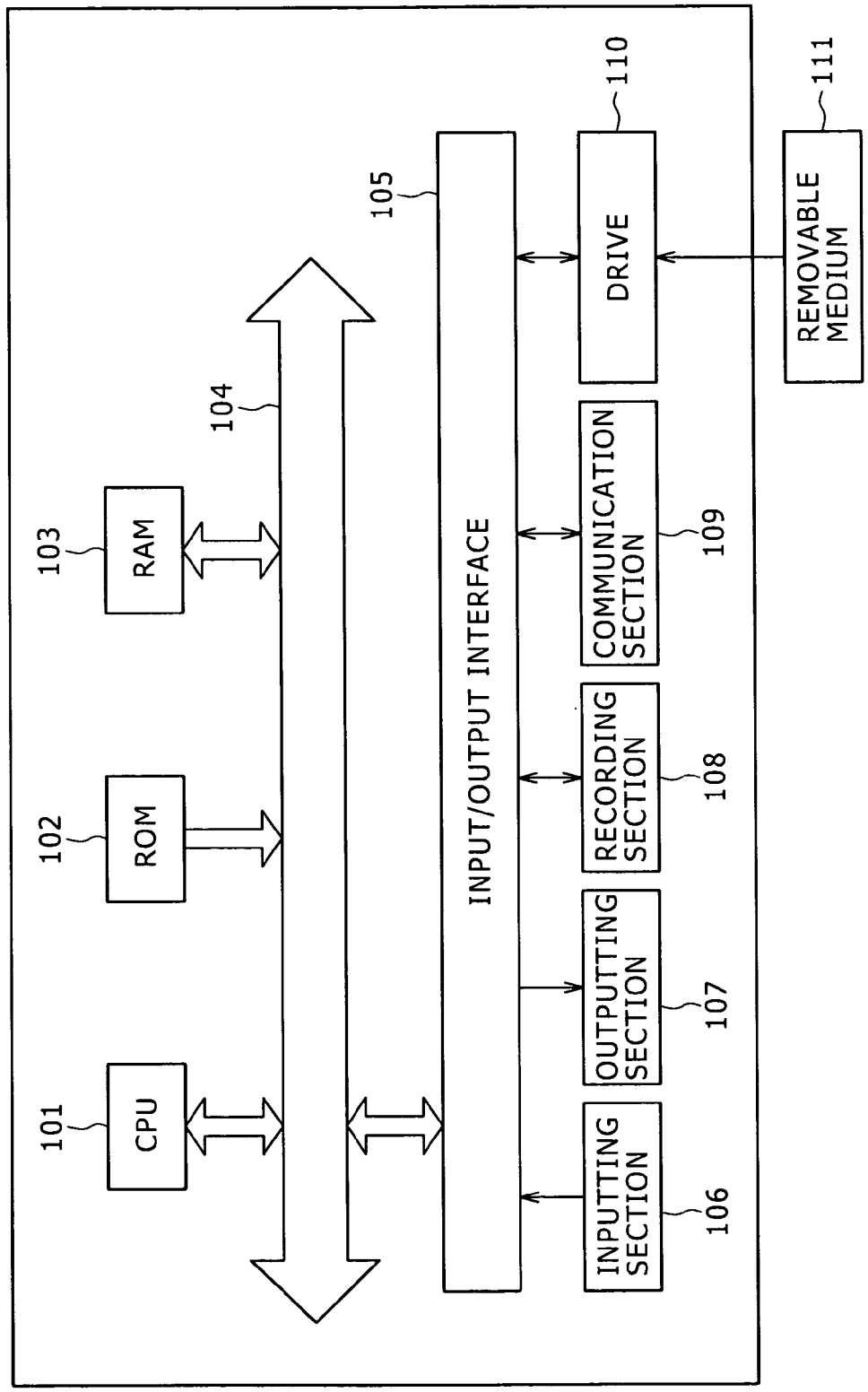

IMAGE PROCESSING APPARATUS, METHOD, AND PROGRAM

CROSS REFERENCES TO RELATED APPLICATIONS

The present invention contains subject matter related to Japanese Patent Application JP 2005-361347 filed in the Japanese Patent Office on Dec. 15, 2005, the entire contents of which being incorporated herein by reference.

BACKGROUND OF THE INVENTION

1. Field of the Invention

This invention relates to an image processing apparatus, method, and a program, and more particularly to an image processing apparatus, method, and a program in which an image recognition function is incorporated.

2. Description of the Related Art

In recent years, a technique of identifying a person has been and is being developed. For example, such a technique has been proposed that, in order to manage coming to and going out from a particular place, an image of a person who tries to come into the place is picked up and it is decided whether or not the images coincides with one of images registered in advance. Then if a coincident image is found, the person is permitted to come into and go out from the place.

Meanwhile, it has become possible for a user to pick up, edit, and enjoy still pictures or moving pictures readily. Consequently, also opportunities in which a user handles a great number of still pictures or long-time moving pictures are increasing. On the ground of such a situation as just described, it has been proposed to apply meta data to still pictures or moving pictures and use the meta data to perform a search so that a user can search out a desired still picture or moving picture readily. An apparatus of the type described is disclosed, for example, in Japanese Patent Laid-Open No. 2005-39354.

In order to apply such meta data as mentioned above, also it has been proposed to detect or recognize a material body or an operation of a type designated in advance by a user from within an image or images. An apparatus of the type described is disclosed, for example, in Japanese Patent Laid-Open No. 2004-145416.

SUMMARY OF THE INVENTION

According to such apparatus as described above, detection or recognition of a material body or an operation is performed by extracting an object individually from within an image (still picture or moving picture). For example, in order to detect a particular person from within a still picture which includes a plurality of images of different persons, the following process is repeated. First, a portion which seems to represent the face is detected from within the still picture. Then, it is discriminated whether or not the detected portion coincides with the pattern of the face to be detected.

Such detection or recognition is sometimes insufficient in accuracy, and this sometimes results in low accuracy in detection or recognition.

Accordingly, it is desirable to provide an image processing apparatus and method which is enhanced in accuracy in detection. In order to satisfy the demand, according to an embodiment of the present invention, a material body or an operation is detected from within an image taking also the probability that the material body of the detection object may appear in the image into consideration.

More particularly, according to an embodiment of the present invention, an image processing apparatus includes extraction means configured to extract a characteristic amount of a region in which a recognition object may possibly be included from within an image of a processing object, parameter retaining means configured to retain a parameter regarding the recognition object, context retaining means configured to retain a context regarding the recognition object, and decision means configured to decide based on the characteristic amount extracted by the extraction means, the parameter retained in the parameter retaining means, and a result of arithmetic operation performed using the context retained in the context retaining means whether or not an image in the region is the recognition object.

The context may be a cooccurrence probability of a plurality of recognition objects.

Alternatively, the context may be a linkage probability in order of the time between a plurality of recognition objects.

The decision means may decide whether or not there exists a region in which a score calculated using the characteristic amount and the parameter is higher than a predetermined threshold value, and perform, where it is decided that a region in which the score is higher than the predetermined threshold value exists, arithmetic operation regarding the recognition object corresponding to an image other than an image in the region using the characteristic amount, the parameter, and the context.

The image processing apparatus may be configured such that, when a new recognition object is set, an image in which the new recognition object exists is read out from a plurality of stored images, and it is decided whether or not the read out image includes a different recognition object, and then a cooccurrence probability is calculated based on a result of the decision and a context regarding the new recognition object retained in the context retaining section is updated based on the cooccurrence probability.

Alternatively, the image processing apparatus may be configured as follows when a new recognition object is set, an image in which the new recognition object exists is read out from a plurality of stored images, and a linkage probability in order of the time regarding the new recognition object is calculated from the read out image, and then a context regarding the new recognition object held in the context retaining section is updated based on the linkage probability.

The image processing apparatus may be configured such that, when the linkage probability in order of the time is calculated, a difference between time points at which the read out images are picked up is calculated and weighting is performed in accordance with the time difference.

According to another embodiment of the present invention, an image processing method or a program for causing a computer to execute a process, includes the steps of extracting a characteristic amount of a region in which a recognition object may possibly be included from within an image of a processing object, retaining a parameter regarding the recognition object, retaining a context regarding the recognition object, and deciding based on the characteristic amount extracted by the process at the extraction step, the parameter retained by the process at the parameter retaining step, and a result of arithmetic operation performed using the context retained by the process at the context retaining section whether or not an image in the region is the recognition object.

In the image processing apparatus, method, and the program, when a predetermined material body or operation is to be detected from within an image or images, a probability value representative of a relationship between material bodies or a probability value regarding a relevancy of operations is used.

With the image processing apparatus, method, and the program, a substance or a person can be recognized with an enhanced degree of accuracy.

BRIEF DESCRIPTION OF THE DRAWINGS

FIG. 2 is a view illustrating a table for material body recognition used in the image processing apparatus;

FIG. 3 is a view illustrating a table for operation recognition used in the image processing apparatus;

FIG. 5 is a flow chart illustrating another recognition process executed by the image processing apparatus;

FIG. 6 is a flow chart illustrating a learning process executed by the image processing apparatus; and FIG. 7 is a block diagram showing a configuration of a personal computer by which the processes can be executed.

DETAILED DESCRIPTION OF THE PREFERRED EMBODIMENT

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

Figure 1:
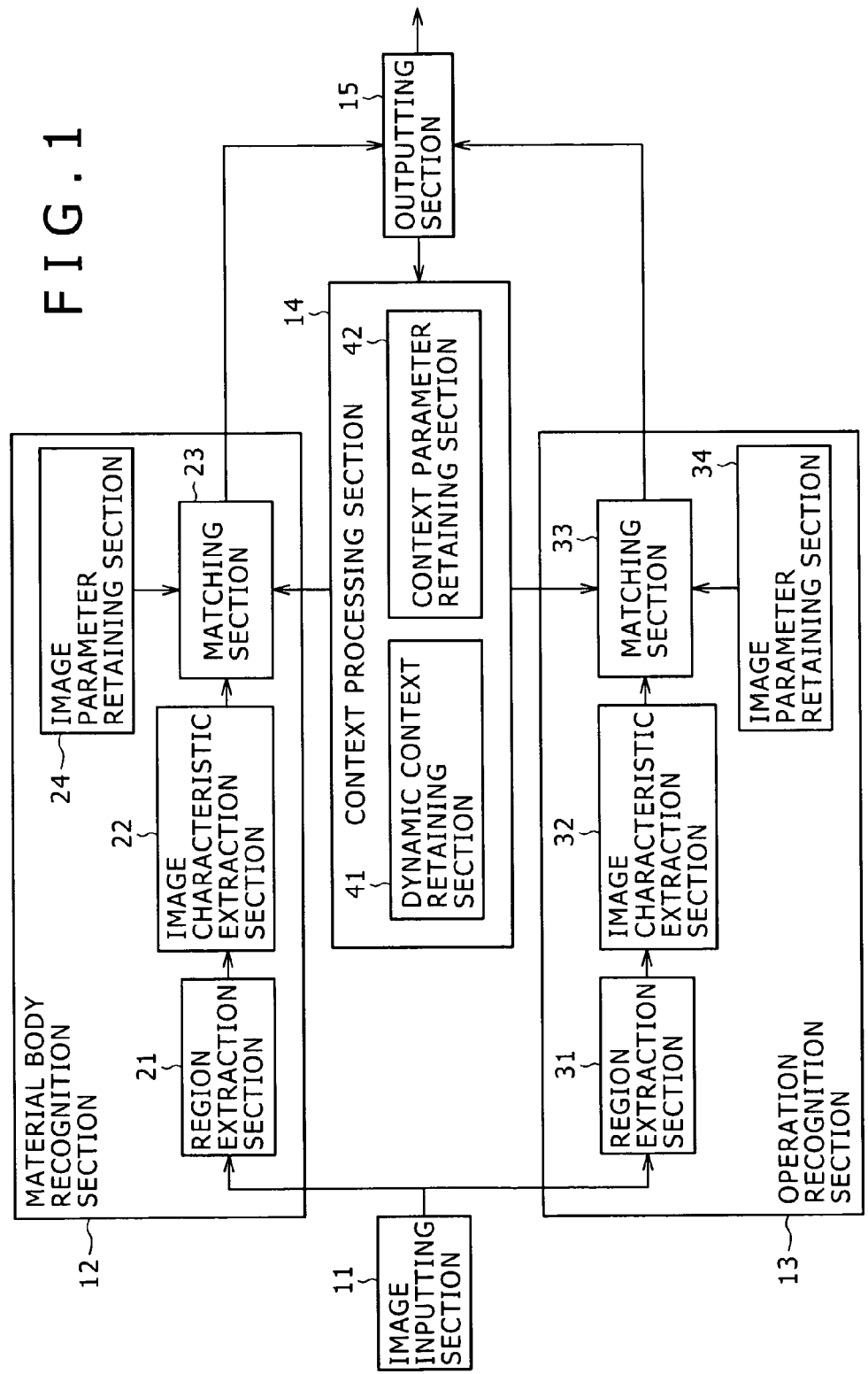
FIG. 1 is a block diagram showing a configuration of an image processing apparatus to which an embodiment of the present invention is applied.

According to an embodiment of the present invention, an image processing apparatus (for example, an image processing apparatus shown in FIG. 1) includes extraction means (for example, an image characteristic extraction section 22 of FIG. 1) configured to extract a characteristic amount of a region in which a recognition object may possibly be included from within an image of a processing object, parameter retaining means (for example, an image parameter retaining section 24 of FIG. 1) configured to retain a parameter regarding the recognition object, context retaining means (for example, a context parameter retaining section 42) configured to retain a context regarding the recognition object, and decision means (for example, a matching section 23 of FIG. 1) configured to decide based on the characteristic amount extracted by the extraction means, the parameter retained in the parameter retaining means, and a result of arithmetic operation performed using the context retained in the context retaining means whether or not an image in the region is the recognition object.

In the following, a preferred embodiment of the present invention is described with reference to the accompanying drawings.

[Configuration and Action of the Image Processing Apparatus]

FIG. 1 shows a configuration of an image processing apparatus to which an embodiment of the present invention is applied. The image processing apparatus shown in FIG. 1 is configured as an apparatus which detects and recognizes, from within a picked up still picture or images or moving picture or images, a particular person, material body, or operation, that is, a particular person, material body, or operation registered in advance.

An apparatus of the type described can be applied, for example, to an apparatus for permitting restricted persons registered in advance to access a predetermined place. To this end, the apparatus picks up an image of a person who tries to access the place and decides whether or not the person is registered in advance to decide whether or not the access is to be permitted.

An apparatus of the type described can be applied also to an apparatus which detects, from among still pictures picked up by a user using a digital still camera or the like or from among moving pictures picked up using a video camera or the like, a still picture or images or a moving picture or images in which an image of a person or a material body that the user wants to detect is included. It is to be noted that the term image in the following description includes both of a still picture and a moving picture unless otherwise specified.

The image processing apparatus shown in FIG. 1 handles an image in such a manner as described above. Referring to FIG. 1, such an image processing apparatus as described above includes an image inputting section 11, a material body recognition section 12, an operation recognition section 13, a context processing section 14, and an outputting section 15.

The image inputting section 11 has a function of inputting a picked up image, a recorded image or a like image. The picked up image may be received from a still camera or a video camera installed, for example, for management of accessing to a predetermined place as described above. Meanwhile, the recorded image is an image, for example, picked up by a user and recorded on a recording medium.

The image (image data) inputted to the image inputting section 11 is supplied to the material body recognition section 12 and the operation recognition section 13.

The material body recognition section 12 has a function of detecting a material body (material body herein is a term including a person and a substance) and recognizing whether or not the detected material body is a material body determined as a detection object in advance. The material body recognition section 12 includes a region extraction section 21, an image characteristic extraction section 22, a matching section 23, and an image parameter retaining section 24.

The region extraction section 21 extracts, from within an image supplied thereto from the image inputting section 11, regions in each of which a material body exists (regions in each of which an image of a material body is included) and supplies information included in the extracted regions to the image characteristic extraction section 22. The image characteristic extraction section 22 extracts, from each of the regions, a characteristic amount of the image in the region and supplies the extracted characteristic amounts to the matching section 23.

The matching section 23 uses the parameters supplied thereto from the image parameter retaining section 24 or/and the context processing section 14 to decide whether or not the image in each of the regions is one of images of material bodies registered in advance. The image parameter retaining section 24 retains parameters (characteristic amounts) to be used for matching to be executed by the matching section 23.

The operation recognition section 13 has a function of detecting a predetermined material body and recognizing an operation of the material body, for example, detecting that the material body of the detection object is a person and recognizing an operation of the person such as walking. The operation recognition section 13 includes a region extraction section 31, an image characteristic extraction section 32, a matching section 33, and an image parameter retaining section 34.

The region extraction section 31 extracts, from within an image supplied thereto from the image inputting section 11, regions in each of which a material body exists (regions in each of which an image of a material body is included), and supplies information in the extracted regions to the image characteristic extraction section 32. The image characteristic extraction section 32 extracts, from each of the regions, a characteristic amount of the image in the region and supplies the characteristic amounts to the matching section 33.

The matching section 33 uses the parameters supplied thereto from the image parameter retaining section 34 or/and the context processing section 14 to recognize whether or not the image in each of the regions is performing a predetermined operation. The image parameter retaining section 34 retains parameters (characteristic amounts) to be used for matching.

Although the material body recognition section 12 and the operation recognition section 13 have similar configurations to each other, they recognize different objects. Therefore, they use different region extraction methods, different parameters to be extracted, and different matching techniques.

The context processing section 14 processes a context necessary for the material body recognition section 12 or the operation recognition section 13 to recognize a material body or operation. The context processing section 14 includes a dynamic context retaining section 41 and a context parameter retaining section 42.

The dynamic context retaining section 41 temporarily retains a recognition result outputted from the outputting section 15 and retains images acquired (picked up) prior and later in time. As hereinafter described, in order to enhance the recognition ratio (accuracy in recognition) of a material body or operation to be recognized by the material body recognition section 12 or the operation recognition section 13, in the present embodiment, for example, when an image is a processing object, the recognition process is executed using also information of images picked up prior and later in time with respect to the image.

To this end, the dynamic context retaining section 41 is provided which retains information of images prior and later in time.

The context parameter retaining section 42 retains, for example, a probability that a friend A and a friend B exist in the same image or the like. In this manner, the context parameter retaining section 42 retains information regarding a relationship between one material body (operation) and another material body (operation), that is, the possibility or probability that both material bodies (operations) may appear.

The outputting section 15 is supplied with an output of the matching section 23 of the material body recognition section 12 or/and an output of the matching section 33 of the operation recognition section 13 and outputs the received output to another section not shown such as, for example, a processing section which uses the recognition process to read out a predetermined image and causes the image to be displayed on a display unit. Further, the output of the outputting section 15 is supplied to the context processing section 14 as occasion demands.

Now, a context parameter (table) supplied to the context parameter retaining section 42 is described. The context parameter retaining section 42 retains tables illustrated in FIGS. 2 and 3.

The table shown in FIG. 2 indicates the probability that two recognition objects may exist in the same image or images picked up prior or later in time and is supplied principally to the matching section 23 of the material body recognition section 12. The table shown in FIG. 2 is hereinafter referred to as material body recognition table 61.

For example, as seen in FIG. 2, in the material body recognition table 61, information of "0.3" is written as the probability that images of the friend A and the friend B may be included in the same image. This probability is also a probability that an image of the friend B may be included in another image picked up prior to or later than (within a predetermined period of time around) the time at which an image in which an image of the friend A is included is picked up.

The friend A and the friend B typically are friends of the user who uses the image processing apparatus shown in FIG. 1, and images of them are possibly included in the same image. The possibility that images of such a friend A and a friend B as mentioned may be included in the same image in this instance is "0.3". This can be represented by the following expression (1):

$$P(\text{friend } A, \text{friend } B) = P(\text{friend } B, \text{friend } A) = 0.3 \quad (1)$$

Meanwhile, although both of the friend A who is a friend to the user and a colleague C who is a colleague to the user are concerned with the user, it is considered that the friend A and the colleague C are not concerned with each other. In such an instance, since the possibility that images of the friend A and the colleague C may be included the same image is low, the probability that images of the friend A and the colleague C may be included in the same image is "0.01". This can be represented by the following expression (2):

$$P(\text{friend } A, \text{colleague } C) = P(\text{colleague } C, \text{friend } A) = 0.01 \quad (2)$$

In this manner, the material body recognition table 61 exhibits a high probability value with regard to persons whose images are included in a high possibility in the same image, but exhibits a low probability value with regard to persons whose images are included in a low possibility in the same image.

In other words, the material body recognition table 61 is formed using the fact that a person generally belongs to a plurality of groups in human relations such as a community of a district, a group of a hobby, and a place of work. Further, persons who belong to the same group are likely to share the same time, and such likeliness is converted into and entered as a numerical value in the material body recognition table 61.

The material body recognition table 61 configured in such a manner as described above is effectively used for image recognition in arrangement or the like of images picked up by a digital still camera or the like.

For example, it is assumed that the faces of the friend B and the colleague C are similar to each other. Further, it is assumed that an image of a person whose identification between the friend B and the colleague C is difficult is included in an image A in which an image of the friend A is included. In this instance, it can be recognized from the context parameter (for example, the material body recognition table 61) described above that the probability that images of both of the friend A and the friend B may be included in the same image is approximately "0.3" and the probability that images of both of the friend A and the colleague C may be included is approximately "0.01".

If the probability values described in the material body recognition table 61 are utilized together for recognition, then it can be recognized that the person mentioned above is the friend B. Consequently, such a situation that a wrong recognition result is provided to the user side can be prevented.

Further, for example, where the image A includes a region (image) which is recognized as the colleague C, the possibility that images of the friend A and the colleague C may be included in the same image is low (in this instance, the probability is approximately 0.01). Thus, if such a probability value as just mentioned is utilized together, then the possibility that such a wrong recognition result that also an image of the colleague C is included in the image in which an image of the friend A is included may be provided to the user side can be reduced.

This applies not only to a person but also to a substance similarly. In particular, it is generally considered that, as seen from FIG. 2, the possibility that images of a glove and a bat for the baseball may be included in the same image is high, but the possibility that images of a glove for the baseball and a golf club may be included in the same image is low. Also such a relationship between a substance and another substance, that is, a probability value representing the possibility that images of the substances may be included in the same image, is described in the material body recognition table 61.

Furthermore, also a relationship between a person and a substance is described in the material body recognition table 61 shown in FIG. 2. For example, if the friend A likes the golf, then the possibility that an image of a golf club may be included in an image in which an image of the friend A is included is high. However, if the friend A does not like the golf, then the possibility that an image of a golf club may be included in an image in which an image of the friend A is included is low. Also such a relationship between a person and a substance as described above, that is, a probability value representative of the possibility that images of them may be included in the same image, is described in the material body recognition table 61.

It is to be noted that, while, in the material body recognition table 61 shown in FIG. 2, a numerical value (probability value) is described in all places, for example, the probability that images of the "friend A" and the "friend B" may be included in the same image and the probability that images of the "friend B" and the "friend A" may be included in the same image are equal to each other (this is indicated by the expression (1) or expression (2) given hereinabove). In other words, the material body recognition table 61 shown in FIG. 2 is symmetrical between a right upper portion and a left lower portion thereof, and therefore, only one of the portions may be described in the material body recognition table 61.

The table shown in FIG. 3 illustrates the probability that a series of operations may occur and is supplied to the matching section 33 of the operation recognition section 13. The table shown in FIG. 3 is hereinafter referred to as operation recognition table 62.

The operation recognition table 62 describes, for example, a probability that, after frame-in (which signifies that an image of a person or the like enters an image frame picked up by a video camera or the like), the frame-in material body (person) may be seated on a sofa. In FIG. 3, the probability in this instance is described as "0.4". This can be represented by the following expression (3):

$$p(\text{sit on sofa}|\text{frame-in})=0.4 \qquad (3)$$

In the expressions (1) to (3), P(A|B) represents the probability that a condition A occurs when another condition B occurs. Therefore, the expression (3) indicates that the probability that, after a condition of "frame-in" occurs, another condition that the frame-in person "is seated on a sofa" may occur is "0.4". Further, for such a probability value (probability that a series of operations may occur successively), for example, a value approximated by N-gram can be used.

The operation recognition table 62 shown in FIG. 3 describes a probability value when an item described in a "row" is performed first and then an item described in a column is described. Accordingly, the probability that, for example, the item of "frame-in" occurs (the condition of the item occurs) after the item "seated on sofa" occurs (the condition of the item occurs) is "0.0" as given by the following expression (4):

$$p(\text{frame-in}|\text{sit on sofa})=0.0 \qquad (4)$$

In particular, in such an instance, since the person sitting on the sofa is already in a frame-in state, such a situation that frame-in of the person occurs after the person is seated on the sofa does not occur. Therefore, the probability value of such a series of operations is "0.0".

In this manner, in the operation recognition table 62 shown in FIG. 3, the probability value that a behavior B may be performed after a behavior A is performed (a series of operations are performed) is described. Therefore, different from the material body recognition table 61 shown in FIG. 2, the operation recognition table 62 shown in FIG. 3 is not symmetrical between a right upper portion and a left lower portion thereof.

In other words, the probability value in the operation recognition table 62 is represented as p(A|B) and represents a conditional probability that the condition A may occur under the condition that the condition B occurs. In this instance, the probability value represents the probability that the operation A may be performed after the operation B is performed. Therefore, as recognized from the expressions (3) and (4), if the order of the behaviors is reversed with respect to time, then also the probability exhibits a different value.

The operation recognition table 62 configured in such a manner as described above is effective as a table for raising the accuracy in recognition when a series of operations of a user are recognized and each of the operations is recognized. For example, according to a known method, operations are discriminated one by one, and the operations are recognized one by one based on a result of the discrimination. Therefore, for example, after an operation of "seated on a sofa" is recognized, a next operation is discriminated independently of the operation of being seated on a sofa. Consequently, an operation of "frame-in" is sometimes recognized after an operation of "seated on a sofa" is recognized.

It is considered that this is a sequence of operations which do not actually occur as described hereinabove. Therefore, if operations are recognized one by one as in the method in related art, then a wrong recognition result that a "frame-in" occurs after "seated on a sofa" is sometimes provided to a user.

In contrast, if the operation recognition table 62 is provided and also the operation recognition table 62 is used in a recognition process, then since the probability that recognition of "frame-in" may occur after recognition of "seated on a sofa" is "0.0" as indicated by the expression (4) above, it is discriminated that such a sequence of operations does not occur. Consequently, such a situation that a wrong recognition result is provided to a user can be prevented.

Also it is possible to weight a context parameter based on a time difference between a plurality of operations performed. For example, a context parameter P' to be used actually is calculated from the value of P retained in the table in accordance with the following expression:

P'(sit on sofa|frame-in)=α(t)P(sit on sofa|frame-in)

where α(t) is a function which decreases monotonously in accordance with the time difference t between the two operations, and represents that the weighting value relatively increases as the time difference t decreases, that is, as the time distance between the two operations decreases. This is because it is considered that the reason why such weighting is performed is that images which have a small time difference therebetween have a high relevancy to each other.

Such a table as described above is produced by learning in advance or by learning during utilization by the user side.

For example, the probability value relating to a substance and another substance in the material body recognition table 61 or the probability value relating to the probability that a series of operations of the operation recognition table 62 may occur successively can be calculated by analyzing a large amount of data collected in advance. Therefore, it is possible to produce a table by describing such probability values calculated in advance as just described.

Further, for example, since the probability value relating to a person and another person or to a person and a substance differs between different users who utilize the material body recognition table 61 (relies upon the user), it is preferably produced by learning when it is utilized by the user side. Therefore, as hereinafter described with reference to a flow chart of FIG. 6, part of the material body recognition table 61 is produced by learning when it is utilized by the user side.

It is to be noted that, since also a table produced using existing data preferably reflects likings of the user side who utilizes the table, naturally learning hereinafter described may be performed.

Operation of the image processing apparatus is shown in FIG. 1. Such tables as described above provided in the context parameter retaining section 42 is described.

Figure 4:
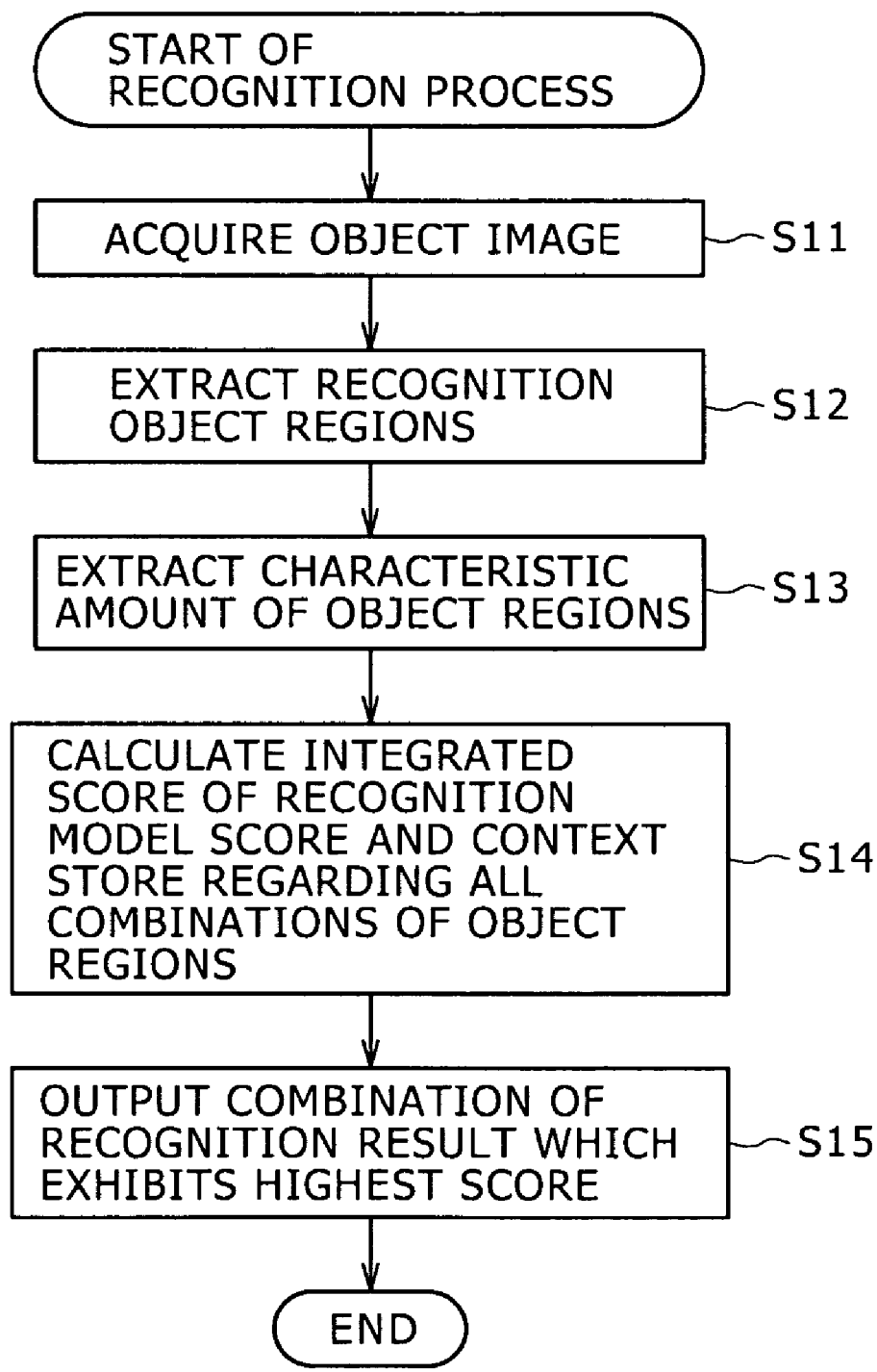
FIG. 4 is a flow chart illustrating a recognition process executed by the image processing apparatus.

FIG. 4 illustrates a process when the image processing apparatus shown in FIG. 1 recognizes a predetermined material body or operation.

Referring to FIG. 4, the image inputting section 11 (FIG. 1) inputs an image of a processing object (image data: in the following description, unless otherwise specified, the term image includes meanings of image data which are image data for displaying the image) at step S11. The image inputted to the image inputting section 11 is supplied to the region extraction section 21 of the material body recognition section 12 and the region extraction section 31 of the operation recognition section 13.

It is to be noted that, as described in the foregoing description of the configuration shown in FIG. 1, the material body recognition section 12 and the operation recognition section 13 have a basically similar configuration and execute a similar process. Therefore, in the following description, the process of the material body recognition section 12 is described as an example, and where some different process is involved, also the process of the operation recognition section 13 is described suitably.

At step S12, the region extraction section 21 detects a region which makes an object of recognition from within the image supplied thereto. For example, where the face is determined as a recognition object, a region discriminated as the face is extracted from the image supplied to the region extraction section 21. Naturally, a plurality of regions may be extracted from one image. The extracted region (image in the region) is supplied to the image characteristic extraction section 22.

At step S13, the image characteristic extraction section 22 extracts a characteristic amount from the image within the region supplied thereto. The extracted characteristic amount is supplied to the matching section 23. the characteristic amount to be extracted and the manner of extraction of the characteristic amount rely upon a matching process by the matching section 23. Further, while the matching section 23 uses, when it performs the matching process, also parameters retained in the image parameter retaining section 24 or parameters retained in the context parameter retaining section 42, also the parameters rely upon the matching process.

For the matching process (image recognition model) by the matching section 23, a method suitable for the recognition object such as, for example, the HMM (Hidden Markov Model) or the SVM (Support Vector Machine) is used. Then, a characteristic amount suitable for the thus used method is extracted and the parameter is retained.

At step S14, the matching section 23 calculates an integrated score of a recognition model score and a context score regarding all combinations of the target regions. For example, it is assumed that three regions of a region A, another region B, and a further region C are extracted by the region extraction section 21. In this instance, all combinations of the target regions are the combinations of the "region A and region B", the "region A and region C", and the "region B and region C".

The recognition model score is a parameter retained in the image parameter retaining section 24, and the context score is a parameter retained in the context parameter retaining section 42. As described hereinabove, where the material body recognition section 12 recognizes a material body, such a material body recognition table 61 as shown in FIG. 2 which is retained in the context parameter retaining section 42 is referred to.

Where the characteristic amount inputted to the matching section 23 is represented by I and the parameter of the material body of the recognition object is represented by O, the matching section 23 performs arithmetic operation based on the following expression (5) in accordance with the Bayez' theorem:

$$P(O|I)=P(I|O)P(L)/P(I) \quad (5)$$

where P(I|O) represents the conditional probability calculated based on an image recognition model utilizing the parameter retained in the image parameter retaining section 24. The value (score) calculated from this term is referred to as image score.

Further, in the expression (5), P(O) is an advance probability that a recognition object may appear based on a parameter retained by the context parameter retaining section 42. In other words, P(O) is a score calculated from a cooccurrence probability or a linkage probability within an image (intraframe) or between images (interframe) of still pictures or moving pictures, and is hereinafter described as context score.

In the expression (5), P(I) may be ignored when actual calculation is performed by the matching section 23. In other words, the expression (5) may be modified to the following expression (5)' so that a score which exhibits a comparatively high likelihood of P(I|O)P(O) may be outputted as a matching process (score arithmetic operation) result:

$$P(O|I)=P(I|O)P(O) \quad (5)'$$

It is to be noted that in related art, since a parameter retained in the image parameter retaining section 24 is used to perform a matching process, arithmetic operation regarding the term of P(I|O) is performed in related art (the image score is arithmetically operated in related art). In other words, parameters registered as images (material bodies) of an object of recognition in the image parameter retaining section 24 in advance are used in related art to perform matching.

In the present embodiment, the matching section 23 multiplies P(I|O) by P(O) as seen from the expression (5) or (5)' to perform matching. This P(O) is a score calculated from an intraframe, interframe cooccurrence, and linkage probability of still pictures or moving pictures as described hereinabove. By multiplication by such a score (context score), matching can be performed also using material bodies whose images are included in one image with a high degree of possibility or material bodies whose images are included in different images where are adjacent each other with respect to time.

Consequently, the accuracy in matching (recognition accuracy) can be raised.

Further, the expression (5) may be modified into the following expression (6), that is, arithmetic operation relating to the matching process may be performed based on the following expression (6):

$$\log P = \log P(I|O) + \alpha \log P(O) \quad (6)$$

Although also the expression (6) is for arithmetic operation of an integrated score of an image score and a context score, the arithmetic operation according to the expression (6) involves also weighting. In the expression (6), P represents the integrated score, and a represents the weighting value. P(I|O) and P(O) are similar to those in the expression (5).

Also the matching section 33 of the operation recognition section 13 performs a process similar to that of the matching section 23 of the material body recognition section 12. However, when P(O) is to be calculated, the matching section 33 refers to such an operation recognition table 62 as seen in FIG. 3 retained in the context parameter retaining section 42 to perform matching relating to the operation.

Further, the operation recognition table 62 describes probability values with which, after a predetermined operation (referred to as first operation) is performed, another predetermined operation (referred to as second operation) may be performed. Since such a table as just described is used, it is necessary for the matching section 33 to acquire information regarding the first operation. To this end, information regarding the first operation (information regarding an operation recognized at a point of time before a second operation is recognized) is retained in the dynamic context retaining section 41.

To the dynamic context retaining section 41, an output of the outputting section 15 is supplied. In particular, information regarding an operation recognized by the operation recognition section 13 is supplied also to and retained into the dynamic context retaining section 41 through the outputting section 15. Then, when the matching section 33 refers to the operation recognition table 62, it refers to the information of the first operation retained in the dynamic context retaining section 41 and reads out context parameters relating to the first operation from the operation recognition table 62. Then, the matching section 33 uses the readout text parameters to execute a matching process (recognition process of the second operation).

The matching section 23 (matching section 33) temporarily retains scores calculated by the matching process and selects the score having the highest value at a point of time when the matching process ends. A combination including the selected score is supplied to the outputting section 15 and further outputted to a succeeding process (not shown) at step S15.

The recognition process is executed in such a manner as described above.

Another recognition process is described with reference to FIG. 5. In the recognition process described hereinabove with reference to FIG. 4, an integrated score of an image score and a context score is calculated with regard to all combinations of target regions.

In contrast, in the recognition process described below with reference to FIG. 5, not an integrated score is calculated with regard to all combinations of target regions, but an integrated score is calculated in order to finally determine whether or not a region in which a material body or operation to be set as a recognition object difficult to finally be determined is a recognition object.

At step S31, recognition results are calculated individually. In order to calculate recognition results, first the region extraction section 21 extracts regions to be made a recognition object from within an image supplied thereto from the image inputting section 11. The regions (image data in the regions) extracted from the region extraction section 21 are supplied to the image characteristic extraction section 22.

The image characteristic extraction section 22 extracts a characteristic amount from the image in each of the regions supplied thereto and supplies the extracted characteristic amounts to the matching section 23. The processes till now are performed basically similarly to the processes described hereinabove with reference to FIG. 4. The matching section 23 uses the parameters retained in the image parameter retaining section 24 to execute a matching process. The matching process is performed by calculating a score in accordance with the following expression (7) while P(O) is ignored because it is equal in probability among the recognition objects:

$$P(O|I) = P(I|O) \quad (7)$$

The scores calculated in this manner (in this instance, image scores) are used to execute a decision at step S32. In particular, at step S32, the matching section 23 decides whether or not each of the image scores is a recognition result which exceeds a threshold value.

In particular, the matching section 23 executes a decision of whether or not a material body to make a recognition object registered in advance (recognition object whose parameter is retained in the image parameter retaining section 24) exists in the images supplied thereto. It is decided that a recognition object registered in advance exists in the detected regions and the decision is determined to be correct when the calculated score is higher than the threshold value.

Therefore, in such a case as just described, that is, where it is decided at step S32 that a recognition result which exceeds the threshold value exists, the processing advances to step S33, at which a process of definitely determining the recognition result exceeding the threshold value as a recognition result and eliminating the recognition result from the recognition object is executed.

At step S34, the image score is calculated with regard to the remaining regions. However, since the image score is calculated already when the recognition process with regard to the individual regions is executed at step S31, the calculated image scores may be used in the process at step S34.

At step S35, the context score is calculated with regard to all combinations including those combinations finally decided already (those regions eliminated from the recognition object when the processing is advanced to step S33). In this instance, where a finally decided region or regions exist, alternatively the context score may be calculated with regard to such regions.

For example, where a region A, another region B, and a further region C are extracted, the combinations of the "region A and region B", "region A and region C", and "region B and region C" are available. Thus, where the context score is to be calculated with regard to all combinations, the context score regarding the three combinations is calculated. Here, if it is assumed that the region A is a finally decided region, then the context score may be calculated with regard to the two combinations of the "region A and region B" and the "region A and region C".

At step S36, that combination which exhibits the highest integrated score is searched for. In particular, results of the processes at steps S34 and S35 are used to execute arithmetic operation in accordance with the expression (5) or (6) to calculate the integrated score. As a result, a recognition result having the highest integrated score is finally decided at step S37.

In this manner, a region which can be finally decided with an image score is finally decided as a recognition result, and by calculating context scores and integrated scores using also such finally decided results, the calculation relating to the score can be reduced when compared with that where the process of the flow chart of FIG. 4 is executed. Besides, enhanced accuracy in recognition similar to that when the process of the flow chart of FIG. 4 is executed can be achieved.

Incidentally, as described hereinabove, in the present embodiment, the context score (the material body recognition table 61 shown in FIG. 2 and the operation recognition table 62 shown in FIG. 3) is used to execute the recognition process. However, if the accuracy of the tables used in the recognition process is low, then there is the possibility that also the recognition result may be low. Further, as described hereinabove, since the probability relating to a person and another person and so forth differ among different users, it is difficult to calculate and describe such probability values in the tables in advance.

Therefore, a process for production (learning) of the material body recognition table 61 or/and the operation recognition table 62 is described with reference to FIG. 6.

At step S51, a registration target region in an image is selected. This selection itself is executed by selecting an image which includes an image of a material body that the user wants to register, that is, a region in which an image of the material body is included in the image. The selected information is supplied to perform the process at step S51.

For example, regions extracted by the region extraction section 21 within an image displayed on a display unit (not shown) are displayed in such a form that they are surrounded each by a rectangle or the like, and a function by which one of the regions surrounded in this manner can be selected by the user is provided. Then, information regarding the region selected by the user is acquired at step S51.

At step S52, an image parameter of the selected region is extracted. This extraction is performed, for example, by extracting a characteristic amount (parameter) from the image of the selected region. The extracted parameter is supplied to and retained by the image parameter retaining section 24 at step S53.

The material body that the user wants to register (to have recognized) is registered in this manner. After this process is executed, the material body registered newly in this manner is decided as a detection object (recognition object). In particular, the newly registered material body is decided as one of pieces of information to be provided as a recognition result of the recognition process described hereinabove with reference to FIG. 4 or 5 to the user side.

Then at step S54, the image (still picture or moving picture) which includes images of the material bodies whose parameter is registered (such a material body is hereinafter referred to as registered material body) is read out. For example, images picked up by the user and recorded on a predetermined recording medium are read out, and it is decided whether or not an image of a registered material body is included in the readout images.

This decision is made by processes by the region extraction section 21, image characteristic extraction section 22, matching section 23, and image parameter retaining section 24. For example, the decision can be made by a process similar to the process at step S31 of FIG. 5.

Then, the image which is decided to include the registered material body is retained once. At step S55, a context parameter is extracted from the retained image. In particular, the retained image includes an image of the registered material body, and a material body whose image is included in the image together with the image of the registered material body is detected. Then, the context parameter between the registered material body and the detected material body is extracted.

The extraction of the context parameter is performed by counting up all possible combinations and calculating the cooccurrence probability or linkage probability of the combinations. However, since the number of images which can be utilized for learning is limited, it is difficult to determine the correct probability value with regard to all possible combinations. Therefore, the probability value may be determined by such a simplified method that, for example, some of the probabilities of the other combinations is discounted and distributed to non-existing combinations in response to the number of times of appearance of the individual material bodies.

Further, in the present embodiment, also the relationship between images positioned sequentially with respect to time is retained as a context parameter. Also it is possible to use such a cooccurrence probability regarding a plurality of images as a context parameter, and the cooccurrence probability is calculated in accordance with the following expression (8):

$$P(X) = (1-\alpha(t))p(A,X) + \alpha(t)p(B,X) \qquad (8)$$

where $\alpha(t)$ is a weighting coefficient and is set to a value corresponding to the difference (time difference t) between the points of time at which the two images are taken. In particular, where the time difference t is small, or in other words, where the points of time of image pickup of the images are close to each other (in such a case that the two images are taken successively), the value of $\alpha(t)$ is proximate to 0.5. On the contrary, where the time difference t is great, the value of $\alpha(t)$ is proximate to 0.

The reason why such weighting is performed is that it is considered that images which exhibit a small time difference therebetween has a high degree of relationship to each other.

The context parameter (probability value) is determined in such a manner as described above.

At step S56, the tables retained in the context parameter retaining section 42 (in the present example, the material body recognition table 61 shown in FIG. 2 and the operation recognition table 62 shown in FIG. 3) are updated with the thus determined context parameter.

At step S57, it is decided whether or not such a sequence of processes as described above are executed by a designated number of times. If it is decided at step S57 that the processes are not repeated by the designated number of times, then the processing returns to step S54, at which the processes at steps S54 et seq. are repeated. Then, if it is decided at step S57 that the processes are repeated by the designated number of times, then the learning process based on the flow chart shown in FIG. 6 is ended.

By repeating the process by a plural number of times in this manner, it becomes possible to re-recognize image data for learning making use of more refined context parameters. Consequently, a higher degree of accuracy in recognition and hence context parameters of a higher degree of accuracy can be achieved.

In this manner, a material body that a user wants to register (a material body that a user wants to have recognized) is registered, and a context parameter relating to the registered material substance is updated. As such updating (learning) is performed, each table retained in the context parameter retaining section 42 can be made appropriate, and the recognition process which is executed using such an appropriate table can provide an appropriate recognition result.

By executing a recognition process in which a context parameter is used in this manner, the accuracy in recognition can be enhanced.

[Recording Medium]

FIG. 7 shows an example of a configuration of a personal computer which executes the series of processes described hereinabove in accordance with a program. Referring to FIG. 7, the personal computer 100 shown includes a central processing unit (CPU) 101 which executes various processes in accordance with a program stored in a read only memory (ROM) 102 or a storage section 108. The program to be executed by the CPU 101, data and so forth are stored suitably into a random access memory (RAM) 103. The CPU 101, ROM 102, and RAM 103 are connected to each other by a bus 104.

An input/output interface 105 is connected to the CPU 101 through the bus 104. An inputting section 106 including a keyboard, a mouse, a microphone, and so forth and an outputting section 107 including a display unit, a speaker, and so forth are connected to the input/output interface 105. The CPU 101 executes various processes in accordance with an instruction inputted from the inputting section 106. Then, the CPU 101 outputs a result of the process to the outputting section 107.

A storage section 108 formed, for example, from a hard disk drive is connected to the input/output interface 105 and stores a program to be executed by the CPU 101 and various data. A communication section 109 communicates with an external apparatus through a network such as the Internet or a local area network.

A program may be acquired through the communication section 109 and stored into the storage section 108.

A drive 110 is connected to the input/output interface 105. The drive 100 drives, when a removable medium 111 such as a magnetic disk, an optical disk, a magneto-optical disk, or a semiconductor memory is loaded therein, the removable medium 111 to acquire a program, data, or the like recorded on the removable medium 111. The acquired program or data is transferred to and stored into the storage section 108 as occasion demands.

While the series of processes described above can be executed by hardware, it may otherwise be executed by software. Where the series of processes is executed by software, a program which constructs the software is installed from a program recording medium into a computer incorporated in hardware for exclusive use or, for example, a personal computer for universal use which can execute various functions by installing various programs.

The program storage medium in which a program to be installed into a computer and placed into an executable condition by the computer is stored may be, for example, as shown in FIG. 7, a removable medium 111 in the form of a package medium formed from a magnetic disk (including a flexible disk), an optical disk (including a CD-ROM (Compact Disk-Read Only Memory), and a DVD [Digital Versatile Disk]), a magneto-optical disk (including an MD [Mini-Disc]), a ROM 102 in which the program is stored temporarily or permanently, a hard disk which configures the storage section 108, or the like. Storage of the program into the program storage medium is performed, as occasion demands, through the communication section 109 which is an interface such as a router and a modem, making use of a wired or wireless communication medium such as a local area network, the Internet, or a digital satellite broadcast.

It is to be noted that, in the present specification, the steps which describe the program recorded in a program storage medium may be but need not necessarily be processed in a time series in the order as described, and include processes which are executed in parallel or individually without being processed in a time series.

While a preferred embodiment of the present invention has been described using specific terms, such description is for illustrative purposes, and it is to be understood that changes and variations may be made without departing from the spirit or scope of the following claims.

What is claimed is:

1. An image processing apparatus, comprising:
   extraction means configured to extract a characteristic amount of a region in which a recognition object may possibly be included from within an image of a processing object;
   parameter retaining means configured to retain a parameter regarding the recognition object;
   context retaining means configured to retain a context regarding the recognition object; and
   decision means configured to decide based on the characteristic amount extracted by said extraction means, the parameter retained in said parameter retaining means, and a result of arithmetic operation performed using the context retained in said context retaining means whether or not an image in the region is the recognition object,
   wherein said decision means decides whether or not there exists a region in which a score calculated using the characteristic amount and the parameter is higher than a predetermined threshold value, and
   performs, where it is decided that a region in which the score is higher than the predetermined threshold value exists, arithmetic operation regarding the recognition object corresponding to an image other than an image in the region using the characteristic amount, the parameter, and the context.

2. The image processing apparatus according to claim 1, wherein the context is a cooccurrence probability of a plurality of recognition objects.

3. The image processing apparatus according to claim 1, wherein the context is a linkage probability in order of the time between a plurality of recognition objects.

4. The image processing apparatus according to claim 1, wherein, when a new recognition object is set, an image in which the new recognition object exists is read out from a plurality of stored images, and
   a linkage probability in order of the time regarding the new recognition object is calculated from the read out image, and then
   a context regarding the new recognition object held in said context retaining means is updated based on the linkage probability.

5. The image processing apparatus according to claim 4, wherein, when the linkage probability in order of the time is calculated, a difference between time points at which the read out images are picked up is calculated and weighting is performed in accordance with the time difference.

6. The image processing apparatus according to claim 1, wherein, when a new recognition object is set, an image in which the new recognition object exists is read out from a plurality of stored images, and
   it is decided whether or not the read out image includes a different recognition object, and then
   a co-occurrence probability is calculated based on a result of the decision and a context regarding the new recognition object retained in said context retaining means is updated based on the co-occurrence probability.

7. An image processing method, comprising the steps of:
   extracting a characteristic amount of a region in which a recognition object may possibly be included from within an image of a processing object, utilizing an extraction section;
   retaining a parameter regarding the recognition object, utilizing a parameter retaining section;
   retaining a context regarding the recognition object, utilizing a context retaining section; and
   deciding based on the characteristic amount extracted by the process at the extraction step, the parameter retained by the process at the parameter retaining step, and a result of arithmetic operation performed using the context retained by the process at the context retaining step whether or not an image in the region is the recognition object, utilizing a decision section,
   wherein the deciding step decides whether or not there exists a region in which a score calculated using the characteristic amount and the parameter is higher than a predetermined threshold value, and
   performs, where it is decided that a region in which the score is higher than the predetermined threshold value exists, arithmetic operation regarding the recognition object corresponding to image other than an image in the region using the characteristic amount, the parameter, and the context.

8. A non-transitory computer-readable medium storing a computer program for causing a computer to execute a process comprising the steps of:
   extracting a characteristic amount of a region in which a recognition object may possibly be included from within an image of a processing object;
   retaining a parameter regarding the recognition object;
   retaining a context regarding the recognition object; and
   deciding based on the characteristic amount extracted by the process at the extraction step, the parameter retained by the process at the parameter retaining step, and a result of arithmetic operation performed using the context retained by the process at the context retaining step whether or not an image in the region is the recognition object,
   wherein the deciding step decides whether or not there exists a region in which a score calculated using the characteristic amount and the parameter is higher than a predetermined threshold value, and
   performs, where it is decided that a region in which the score is higher than the predetermined threshold value exists, arithmetic operation regarding the recognition object corresponding to an image other than an image in the region using the characteristic amount, the parameter, and context.

9. An image processing apparatus, comprising:
   an extraction section configured to extract a characteristic amount of a region in which a recognition object may possibly be included from within an image of a processing object;
   a parameter retaining section configured to retain a parameter regarding the recognition object;
   a context retaining section configured to retain a context regarding the recognition object; and
   a decision section configured to decide based on the characteristic amount extracted by said extraction section, the parameter retained in said parameter retaining section and a result of arithmetic operation performed using the context retained in said context retaining section whether or not an image in the region is the recognition object,
   wherein the decision section decides whether or not there exists a region in which a score calculated using the characteristic amount and the parameter is higher than a predetermined threshold value, and
   performs, where it is decided that a region in which the score is higher than the predetermined threshold value exists, arithmetic operation regarding the recognition object corresponding to an image other than an image in the region using the characteristic amount, the parameter, and the context.

* * * * *